United States Patent [19]
Nagai et al.

[11] Patent Number: 5,212,417
[45] Date of Patent: May 18, 1993

[54] STEPPING MOTOR FOR DRIVING HEAD CARRIAGE AND DISC DRIVE UNIT COMPRISING SUCH MOTOR

[75] Inventors: Michiaki Nagai, Koganei; Takahiro Sakaguchi, Kodaira, both of Japan

[73] Assignee: TEAC Corporation, Japan

[21] Appl. No.: 877,281

[22] Filed: May 1, 1992

[30] Foreign Application Priority Data

May 7, 1991 [JP] Japan .............................. 3-031025[U]

[51] Int. Cl.⁵ ........................ H02K 37/00; G11B 5/55
[52] U.S. Cl. .................... 310/49 R; 360/106; 74/89.15
[58] Field of Search ............ 310/49 R, 40 R, 40 MM; 74/89.15, 428.8 R; 360/105, 106

[56] References Cited

U.S. PATENT DOCUMENTS

| | | | |
|---|---|---|---|
| 4,139,877 | 2/1979 | Townsend | 360/106 |
| 4,716,776 | 1/1988 | Sakaguchi | 74/89.15 |
| 5,023,498 | 5/1991 | Abe | 360/105 |

FOREIGN PATENT DOCUMENTS

60-192170 12/1985 Japan .
2-42266 3/1990 Japan .

Primary Examiner—Steven L. Stephan
Assistant Examiner—Matthew Nguyen
Attorney, Agent, or Firm—Andrus, Sceales, Starke & Sawall

[57] ABSTRACT

A stepping motor for driving a head carriage having a motor axis on which is provided a lead screw comprises a seat plate that forms a back end of the motor, said seat plate being provided with a projection that projects toward a radial direction of the motor axis. At the time of the alignment of a head and a disk, the stepping motor is rotated by rotating a jig which is engaged with the projection. Thus the stationary position of the head carriage along a direction of its movement is adjusted.

17 Claims, 10 Drawing Sheets

STEPPING MOTOR FOR DRIVING HEAD CARRIAGE AND DISC DRIVE UNIT COMPRISING SUCH MOTOR

BACKGROUND OF THE INVENTION

The present invention relates to a stepping motor for driving a head carriage and a disk drive unit comprising such a motor, and particularly to a stepping motor having a lead screw on a motor axis, and a disk drive unit comprising such a motor.

Recently, efforts have been made toward downscaling an equipment comprising a disk drive unit as a storage device, facilitating a strong requirement for downscaling of a disk drive unit that is included in such an equipment. However, downscaling of a disk drive unit that is included in an equipment has long been pursued almost to an extent that structurally a disk can hardly be made smaller any more. Accordingly, further downscaling of a disk drive unit requires a downscaling of components.

Generally, in a disk drive unit of this type, a lead screw is provided on a motor axis of a stepping motor and is engaged with a head carriage to form a drive mechanism. That is, a rotational movement of a stepping motor is converted to a reciprocal movement of a head carriage. The simplest configuration to realize this is the one in which a direction of a movement of a head carriage is parallel with an axis of a stepping motor.

FIG. 1 is a plan view and FIG. 2 is an exploded perspective view of a conventional mechanism for driving a head carriage in a magnetic disk drive unit, as described in Japanese Laid-Open Utility Model Application No. 2-42266. In a body 2 of a stepping motor 1 is provided a stator coil 3, and housed in the stator coil 3 is a cylindrical magnet 4.

A flange provided in the body 2 of the motor, is fixed to a side 13 of a chassis base 12 by a clamp plate 11. This clamp plate 11 fixes the flange between the clamp and the side 13 of the chassis base 12 by tightening a screw 10. In this way the motor 1 is fixed to the chassis base 12, and a motor axis 5 that extends beyond the plane of the flange 9 is housed inside the chassis base 12.

The end of the motor axis 5 is engaged with a bearing 15 fixed to a support post 14 fitted perpendicularly on the bottom of the chassis base 12. The end of the motor axis 5 that resides inside the motor 1 is engaged with a leaf 7 and is pushed permanently by an elastic force toward the direction A shown in the figure. Consequently, the motor axis 5 has no axial play and is kept at the same position permanently. The part of the motor axis 5 that is an extension from the body 2 is threaded in its entirety so that a lead screw 6 is formed.

A head carriage 20 comprising a magnetic head 21 is provided in such a way that it can slip freely along a guide rod 22. The head carriage 20 is provided with a projection 23 which is engaged with the lead screw 6. When the lead screw rotates, the projection 23 gets a propulsion in the axial direction of the lead screw 6, thus making the head carriage 20 to move along the guide rod 22.

A stepping motor is used as the motor 1 and the lead screw 6 is rotated a specified angle at a time. Therefore the head carriage 20 moves in the directions A or B of the figure a specified distance, allowing the magnetic head 21 to move radially over a magnetic disk 24 and to carry out a read/write operation.

When assembling the above mechanism for driving a head carriage, an alignment control is performed whereby the track on the magnetic disk 24 is aligned correctly with the stationary position of the head 21. In this alignment, the motor 1 is rotated on the motor axis 5 so that the stationary position of the head 21 is aligned with a reference track of the disk 24.

On a cap 8, which forms the part of the stepping motor 1 which is opposite from the side the motor axis 5 extends from, is formed a protrusion 25 with a hexagonal shape. In order to perform the above alignment, a jig 26 having a depression that corresponds to the protrusion 25 is employed to rotate the motor 1, so that the alignment of the position of the head 21 and the position of the reference track is determined in a way known in the art. The motor 1 is then fixed to the specified position on the side 13 by tightening the screw 10.

The center of the hexagonally shaped protrusion 25 of the cap 8 is provided with a round inward depression, and is positioned a specified distance away from the part of the leaf 7 which presses the motor axis, when the motor 1 is mounted onto a disk drive unit. When a large force in the direction of B acts on the motor axis at the time of a seek operation on the disk drive, the part of the leaf that produces pressure displaces in the direction of B to a great extent. Since an excess of this displacement fatigues the leaf 7, the round protuberance of the protrusion 25 acts to limit the displacement to a specified amount.

Generally, in a disk drive unit of this type, an overall depth is determined by the size of the disk and the length of the motor for driving a head carriage. Since the protrusion 25 is provided at the back end of the motor 1 to facilitate the engagement to the jig 26, the size of the protrusion 25 makes the motor 1 that much longer at the back end. Accordingly, a disadvantage has arisen in the prior art in that an overall depth of a disk drive unit is made greater due to the size of the protrusion 25, and there has been a demand that an overall depth of a disk drive unit be made smaller.

SUMMARY OF THE INVENTION

Accordingly, a general object of the present invention is to provide a novel and useful stepping motor for driving a head carriage and a disk drive unit comprising such a motor.

A more specific object of the present invention is to provide a stepping motor and a disk drive unit comprising such a motor wherein an overall depth of a disk drive unit is made smaller by eliminating a protrusion provided on a back end.

In order to achieve the above object, the present invention comprises a stepping motor for driving a carriage head for use in a disk drive unit, comprising a main part of a motor consisting of a motor axis on which a lead screw for driving a head carriage is provided, a rotor for rotating the motor axis, and a stationary part including a stator and a body of a motor, and an engagement part provided in the stationary part of the main part of a motor and projecting in the radial direction of the motor axis, a disk drive unit thereof comprising a fixing means for fixing the main part of the motor, and the main part of the motor being rotationally controllable by means of a jig that is engaged with the engagement part, and being fixed by the same means after the position of the main part of the motor is rotationally controlled on the motor axis.

The present invention eliminates a protrusion extending from a back end of the motor by providing the engagement part, with which the alignment jig is engaged, on the side of the motor, thus reducing a length of the stationary part of the main part of the motor and reducing an overall depth of a disk drive unit.

The present invention also reduces the number of parts by providing, for use as an engagement part, a projection on a leaf which receives the motor axis in the stationary part of the motor and by eliminating a seat plate.

Other objects and further features of the present invention will be apparent from the following detailed description when read in conjunction with accompanying drawings.

DESCRIPTION OF THE PREFERRED EMBODIMENTS

Figure 3:
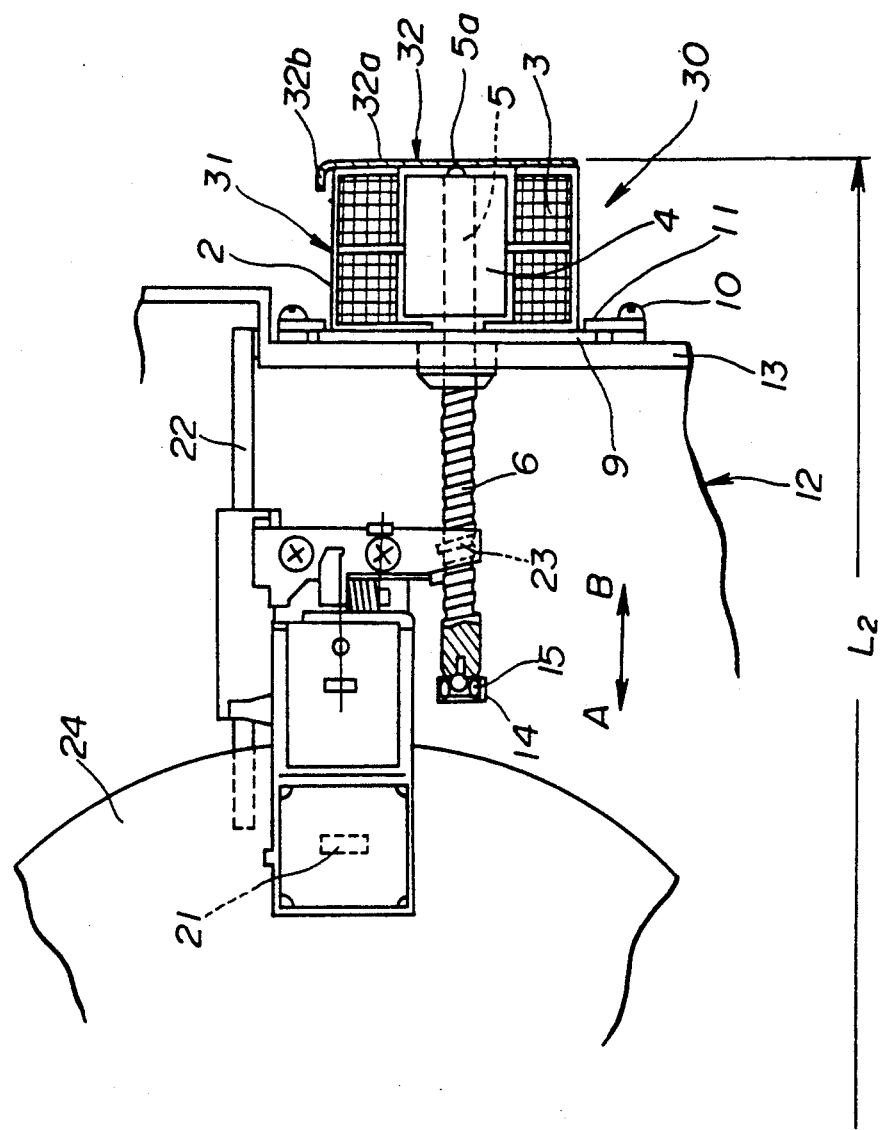
FIG. 3 is a cross-sectional view of a stepping motor of the first embodiment of the present invention.

A stepping motor 30 of the first embodiment of present invention comprises a leaf 32 at a back end of a main part 31 of a motor, as shown in FIG. 3. The main part 31 of the motor comprises a motor axis 5, a cylindrical magnet 4 serving as a rotor that rotates the axis, a coil 3 as a stator, and a body 2. The coil 3 and the body 2 form a stationary part of the main part 31 of the motor. The leaf 32 is made of a metal plate as thin as 0.3 mm, and consists of a disk-shaped main part 32a and a projection 32b. The projection 32b projects outward from the circumference of the main part 32a and is bent so that the bent part lies above the circumference of the body 2. The projection 32b lies about 0.8 mm above the circumference of the body 2 of the main part of the motor 30. The projection 32b is about 2 mm in width and has a sufficient strength in cross direction. This projection 32b has a function in alignment control when engaged with a jig 40, as described using FIG. 4 later.

The circumference of the main part 32a of the leaf 32 is fixed to the body 2 of the main part 31 of the motor 31 by spotwelding. When the motor 30 is mounted onto a disk drive unit, the front end of the motor axis 5 is engaged with a bearing 15 fixed to a support post 14 fitted perpendicularly on a chassis base 12. The length of the motor axis 5 is set so that, when the motor 30 is fixed to a side 13, it is about 0.5 mm longer than the distance between the bearing 15 and the seat plate 32 which the end of the motor axis 5 contacts. Accordingly, an end 5a of the motor axis 5 housed in the body 2 is pressed by the main part 32a of the leaf near the center, causing the leaf 32 to deflect about 0.5 mm. The motor axis 5 is propelled toward the direction of an arrow A due to this elasticity of the leaf 32. Consequently, when the motor 30 is mounted onto a disk drive unit and a lead screw 6 is engaged with a head carriage, the lead screw 6 has no axial play.

Figure 5:
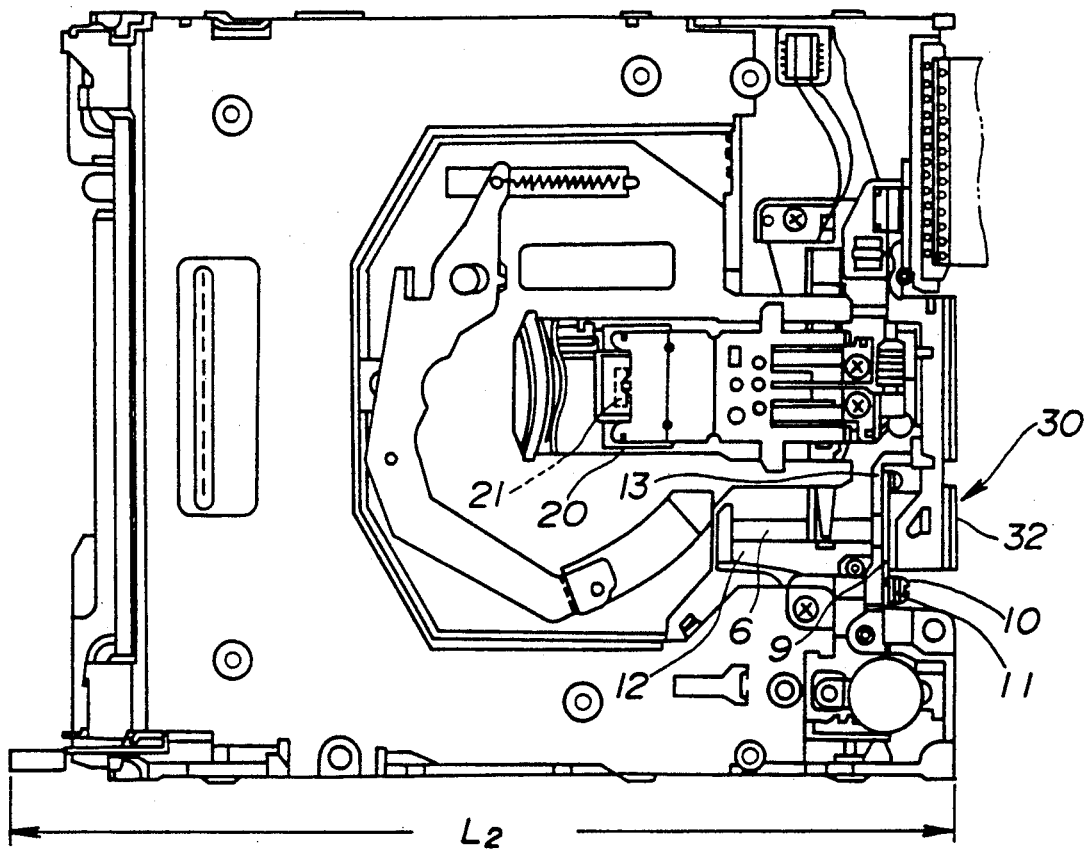
FIG. 5 is a plan view of an embodiment of a disk drive unit of the present invention where a stepping motor illustrated in FIG. 3 is utilized.

FIG. 5 is a plan view of an embodiment of a magnetic disk drive unit of the present invention where a stepping motor shown in FIG. 3 is utilized. The stationary part of the motor 30 is fixed to the side 13 of the chassis base 12 of the magnetic disk drive unit, as shown in FIG. 5. The lead screw 6 extends in parallel with the movement of the head carriage 20. In this configuration of the motor 30, the back end of the motor 30 is at the deepest end of the magnetic disk drive unit, being toward the side of the unit. The radius of a magnetic disk is of a standard dimension in accordance with the specified standard, and the maximum movement of the head carriage is determined by the radius of the magnetic disk. Accordingly, the minimum value of the length $L_2$, which is an overall length measured along the movement of the head carriage 20 of this magnetic drive unit, is dependent on the length of the stationary part of the motor 30, that is the distance from the mounting plane of the motor on the side 13 of the chassis base 12 to the back end of the motor 30.

Figure 4:
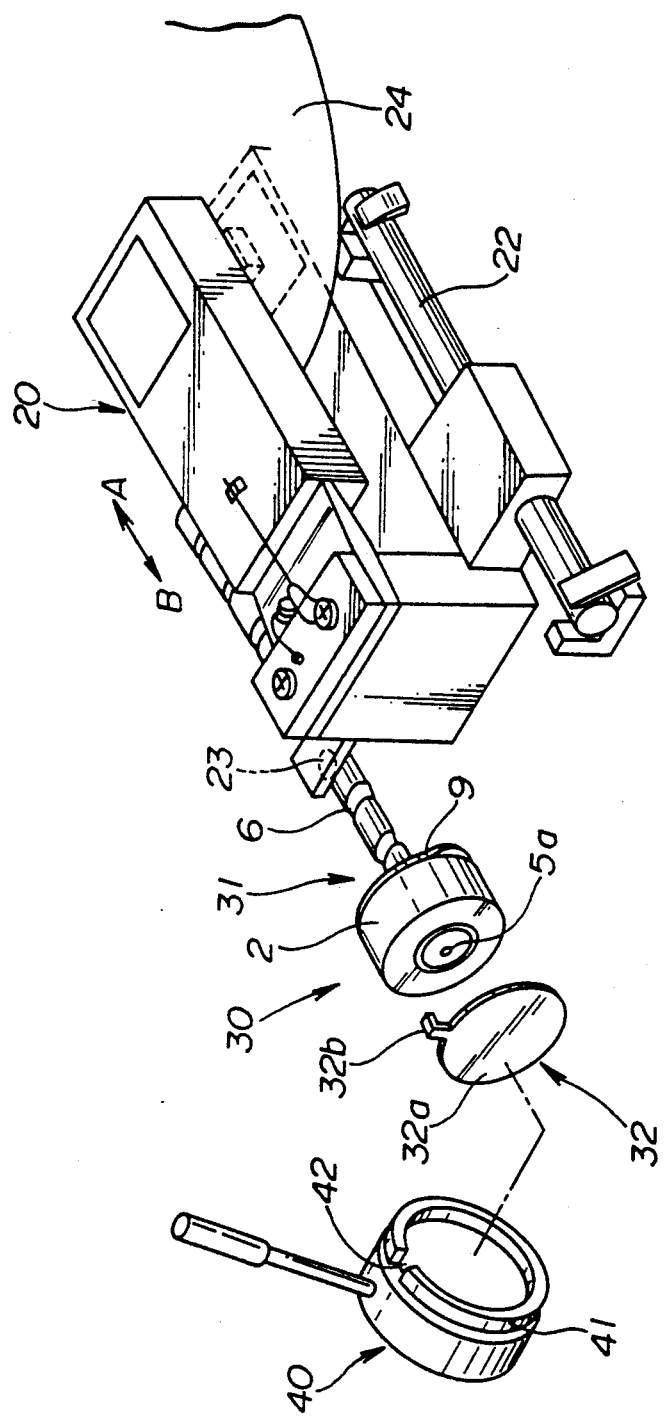
FIG. 4 is an exploded perspective view of a stepping motor illustrated in FIG. 3.

The alignment in the disk drive unit utilizing the motor 30 of this embodiment will be described below. An alignment jig 40 comprises a cylindrical part whose inner diameter is much larger than the outer diameter of the main part 31 of the motor 30, as shown in FIG. 4. The cylindrical part 41 is provided with a notch 42 at one point.

Figure 6:
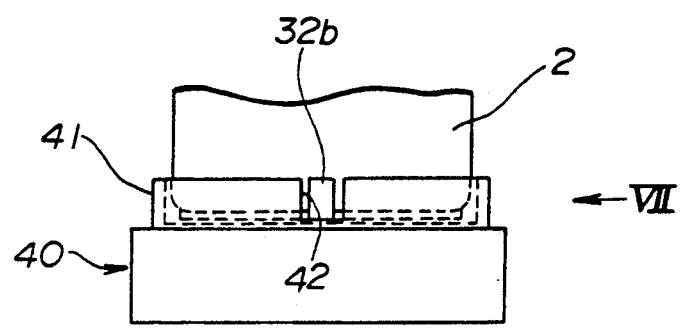
FIG. 6 is a fragmentary side view illustrating a engagement between a jig and a main part of a motor which are in alignment.
Figure 7:
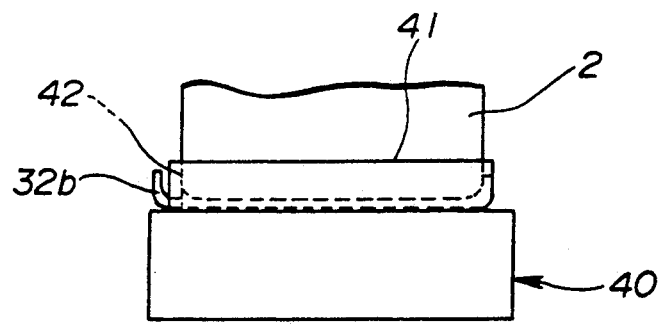
FIG. 7 is a view taken in the direction VII in FIG. 6.

FIG. 6 illustrates the engagement of the alignment jig 40 to the body 2a of the main part 31 of the motor. FIG. 7 is a view taken in the direction of VI of FIG. 6. As shown in both figures, the cylindrical part 41 receives the back end of the main part of the motor 31, and the notch 42 receives the projection 32b. Accordingly, the main part 31 of the motor can be rotated by rotating the jig 40.

When performing an alignment, the stationary part of the motor 30 is temporarily fixed to the side of the chassis base 12 of the disk drive unit. This temporary fixing is performed by tightening a screw 10 lightly so that a flange 9 is held lightly by a clamp plate 11. The motor 30 is rotationally controlled then by using the jig 40 so that the head 21 of the head carriage 20 and the reference track on the disk are aligned. After determining that the alignment is obtained between the head 21 and the reference track, in a way known in the art, the screw 10 is tightened and the motor 30 is fixed securely.

Figure 1:
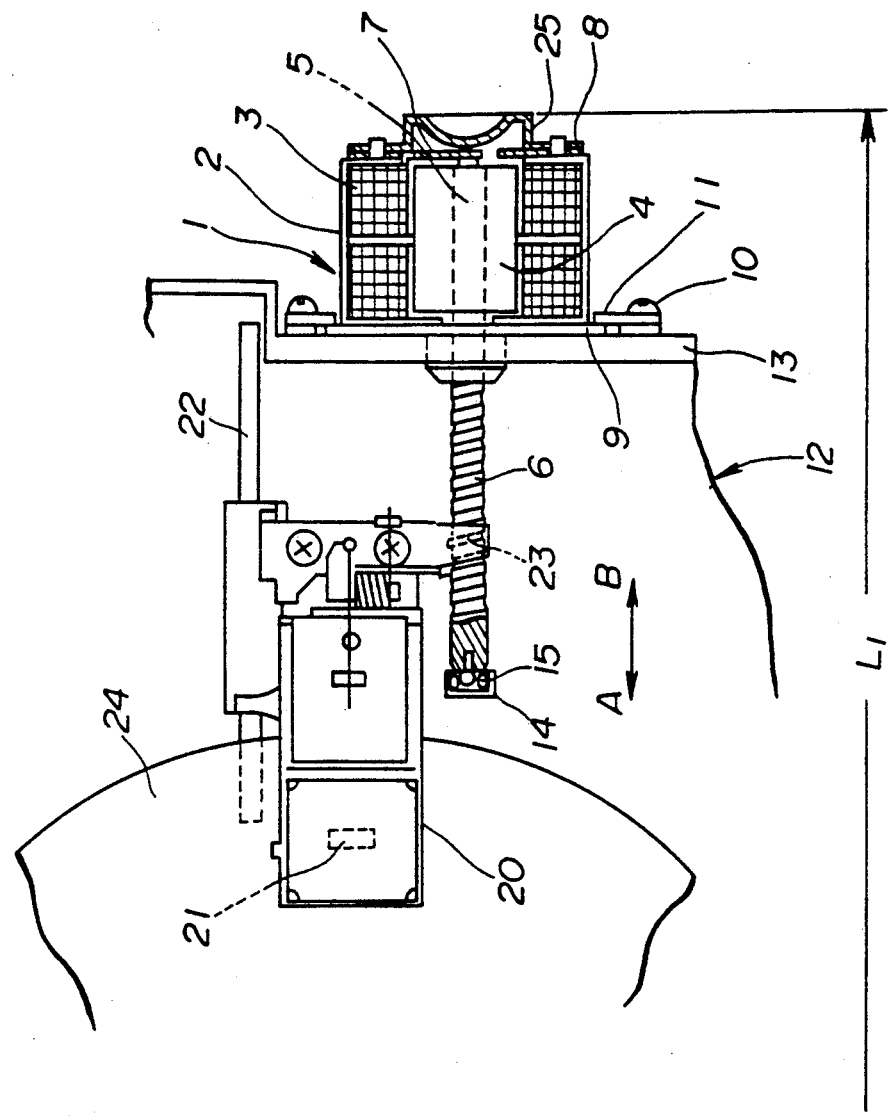
FIG. 1 is cross-sectional view of a conventional stepping motor for driving a head carriage.
Figure 2:
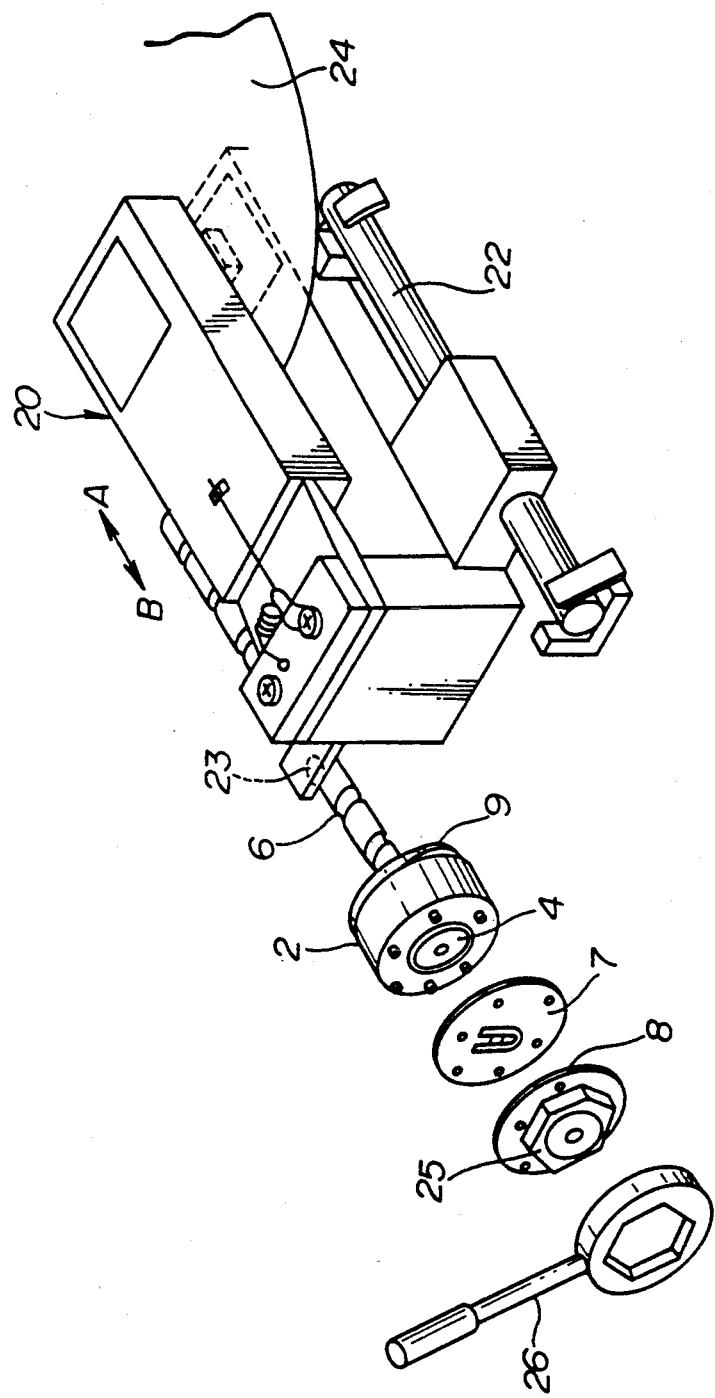
FIG. 2 is an exploded perspective view of a motor illustrated in FIG. 1.

As is evident from the above, since the projection 32b projects in a radial direction of the motor axis 5 and is bent toward the direction of the lead screw, the length by which the motor 30 extends toward the back is kept as small as 0.3 mm, which is a thickness of the leaf 32. Accordingly, the length of the motor 30 is smaller than the conventional one shown in FIGS. 1 and 2, permitting the reduction of the overall length $L_2$ of the disk drive unit, shown in FIG. 5, utilizing the motor 30.

Figure 8:
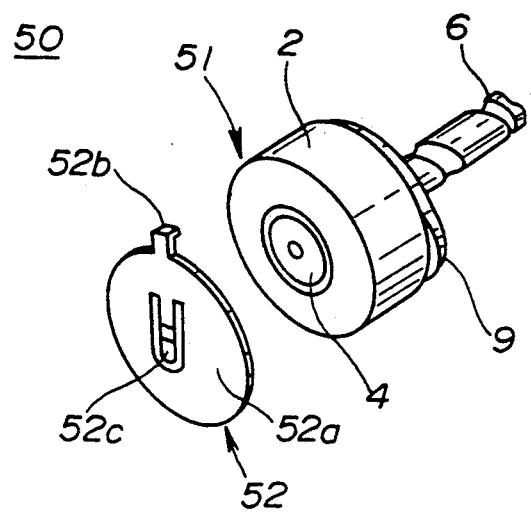
FIG. 8 is an exploded perspective view of a stepping motor 50 of the second embodiment of the present invention.
Figure 9:
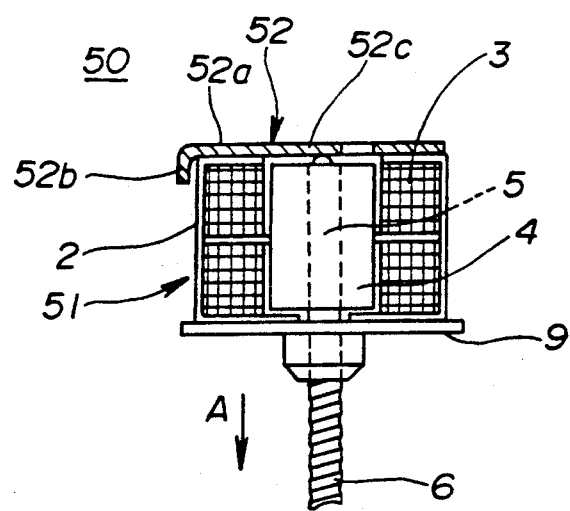
FIG. 9 is a enlarged cross-sectional view of a stepping motor 50 illustrated in FIG. 8.

The second embodiment of the present invention is described below. FIG. 8 is an exploded perspective view of a stepping motor 50 of the second embodiment of the present invention, and FIG. 9 is an enlarged cross-sectional view of the stepping motor 50. In FIGS. 8 and 9, components that are the same as FIGS. 3 and 4 have the same symbols, and descriptions thereof are omitted. A leaf 52 is a plate made of a metal such as stainless steel and comprises a cylindrical main part 52a, a projection 52b and an pressure tongue 52c. The main part 52a of the leaf 52 is cut in a U shape at its center so as to form a pressure tongue 52c where the end of the motor axis 5 contacts the leaf. The pressure tongue 52c is bent slightly toward the motor axis 5 when the motor 50 is not mounted onto a disk drive unit. The projection 52b projects outward from the circumference of the main part 32a is bent so that the bent part lies above the circumference of the body 2. The projection 52b lies about 0.8 mm above the circumference of the body 2 of a main part 51 of the motor. The projection 52b is about 2 mm in width and has a sufficient strength in tangential direction to withstand applied torque. This projection 52b has a function in alignment control when engaged with a jig 40, as the first embodiment above.

The circumference of the main part 52a of the leaf 52 is fixed to the body 2 of the motor 51 by spotwelding. When the motor 50 is mounted onto a disk drive unit, the front end of the motor axis 5 is engaged with a bearing 15 fixed to a support post 14 fitted perpendicularly on a chassis base 12. The length of the motor axis 5 is set so that, when a stationary part of the motor 50 is fixed to a side 13, it is about 0.5 mm longer than the distance between the bearing 15 and the side of the pressure tongue 52c of the leaf 52 which the end of the motor axis 5 contacts. Accordingly, an end 5a of the motor axis 5 housed in the stationary part of the motor 50 is pressed by the pressure tongue 52c of the leaf 52, causing the pressure tongue 52c to deflect about 0.5 mm. FIG. 9 illustrates the mounting of the motor 50 onto the disk drive unit, showing the pressure tongue 52c transformed elastically and providing the pressure on the motor axis 5. The motor axis 5 is propelled toward the direction of an arrow A due to the elasticity of the pressure tongue 52c. Consequently, when the motor 50 is mounted onto a disk drive unit and a lead screw 6 is engaged with a head carriage, the lead screw 6 has no axial play.

Figure 10:
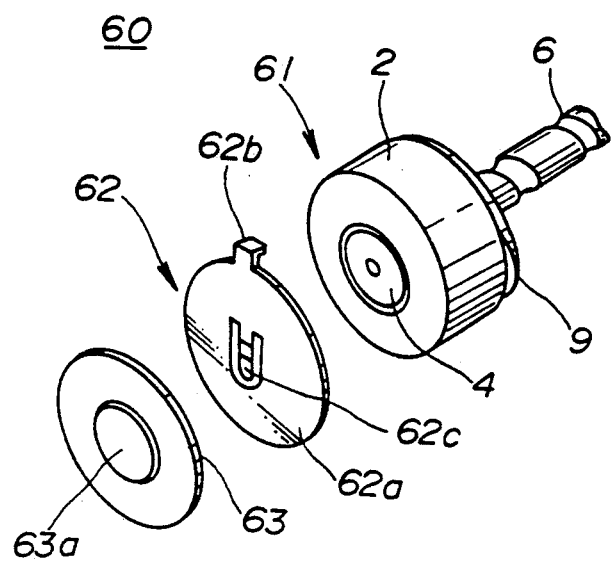
FIG. 10 is an exploded perspective view of a stepping motor 60 of the third embodiment of the present invention.
Figure 11:
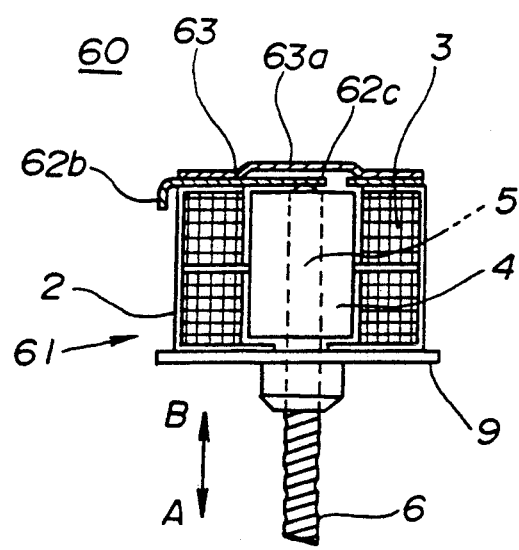
FIG. 11 is an enlarged cross-sectional view of a stepping motor 60 illustrated in FIG. 10.

The third embodiment of the present invention will be described below. FIG. 10 is an exploded perspective view of a stepping motor 60 of the third embodiment of the present invention, and FIG. 11 is an enlarged cross-sectional view of the stepping motor 60. In FIGS. 10 and 11, components that are the same as FIGS. 3 and 4 have the same symbols, and descriptions thereof are omitted. A leaf 62 is a plate made of a metal such as stainless steel and comprises a cylindrical main part 62a, a projection 62b and an pressure tongue 62c. The main part 62a of the leaf 62 is cut in a U shape at its center so as to form a pressure tongue 62c where the end of the motor axis 5 contacts the leaf. The pressure tongue 62c is bent slightly toward the motor axis 5 when the motor 60 is not mounted onto a disk drive unit. The projection 62b projects outward from the circumference of the main part 62a and is bent so that the bent part lies above the circumference of the body 2. The projection 62b lies about 0.8 mm above the circumference of the body 2 of a main part 61 of the motor. The projection 62b is about 2 mm in width and has a sufficient strength in cross direction. This projection 62b has a function in alignment control when engaged with a jig 40, as the first embodiment above. The function of the leaf 62 is the same as the leaf 52 of the motor 50 described above, so the description thereof is omitted.

A seat plate 63 positioned outside the leaf 62 is fixed to the main part 62a of the leaf 62 by spotwelding. The center of the seat plate 63 includes a depression 63a depressing about 0.5 mm toward the side opposite the plate 62. Even when a large force is applied to the motor axis 5 in the direction of an arrow B, the pressure tongue 62c is contacted by the depression 63a after deflecting about 0.5 mm, and further deflection is prevented. Accordingly, a permanent transformation of the pressure tongue 63c by an excess deflection or a long-term use, is prevented.

Figure 12:
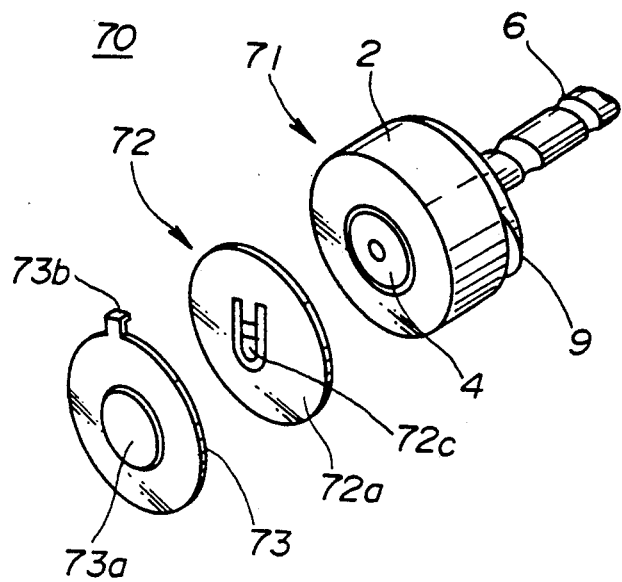
FIG. 12 is an exploded perspective view of a stepping motor 70 of the third embodiment of the present invention.
Figure 13:
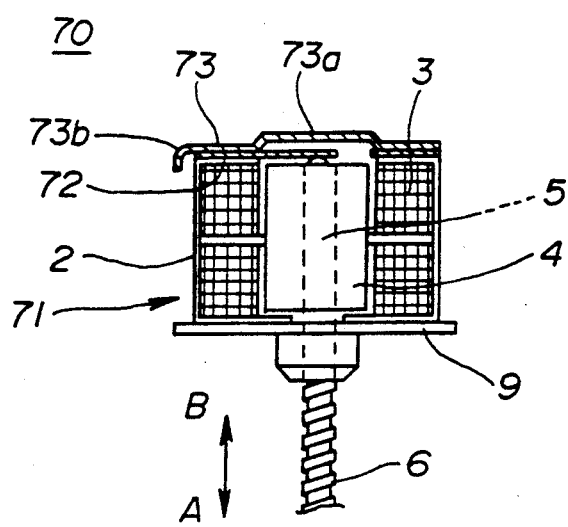
FIG. 13 is an enlarged cross-sectional view of a stepping motor 70 illustrated in FIG. 12.

The fourth embodiment of the present invention is described below. FIG. 12 is a exploded perspective view of a stepping motor 70 of the fourth embodiment of the present invention, and FIG. 13 is a enlarged cross-sectional view of the stepping motor 70. In FIGS. 12 and 13, parts that are the same as FIGS. 3 and 4 have the same symbols, and the descriptions thereof are omitted. The projection 62b of the motor 60, which is engaged with a jig, corresponds to a projection 73b in the motor 70, which is provided on a circumference not of a leaf 72 but of a seat plate 73. The rest of the configuration of the motor 70 remains the same as the motor 60 described above, and the detailed description thereof is omitted.

Figure 14:
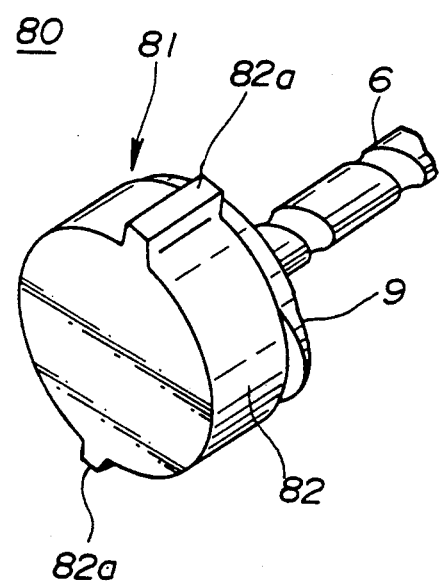
FIG. 14 is an enlarged perspective view of a stepping motor 80 of the fifth embodiment of the present invention.

The fifth embodiment of the present invention is described below. FIG. 14 is an enlarged perspective view of a stepping motor 80 of the fifth embodiment of the present invention. A body 82 of a main part 81 of the motor comprises two projections 82a that are 180 degrees apart on a circumference. The projections 82a have the same function as the projection 32b of the first embodiment described above. That is, the projections 82a are engaged with a notch on an alignment jig provided with a notch similar to the one on the jig 41 shown in FIG. 4, allowing the main part 81 of the motor to rotate with the rotation of the jig.

The fifth embodiment permits, as does the first embodiment, the reduction of the length of the stationary part of the motor 80 and the reduction of an overall depth of a disk drive utilizing motor 80, because the projections 82a project in the radial direction of the stationary part of the main part 81 of the motor.

While only one projection 32b is provided in the first embodiment, it is equally preferable to provide two or more projections 32b, as is evident from the fifth embodiment. The same applies to the second through fourth embodiments. It goes without saying that the fifth embodiment can comprise one, or more than three projections 82a.

The present invention is not limited to the embodiments disclosed specifically, and variations and modifications may be made without departing from the scope of the present invention.

What is claimed is:

1. A stepping motor for driving a head carriage, for use in a disk drive unit comprising:
   a main part of the motor comprising a motor axis on which is formed a lead screw for driving a head carriage, a rotor for rotating said motor axis and a stationary part of the motor, said stationary part including a stator, a body of the motor, and a leaf that presses an end of said motor axis at said body of the motor, when installation in a disk drive unit is complete, by an elastic force directed along said motor axis; and
   an engagement part provided on said stationary part of the main part of the motor, said engagement part comprising one or more projections formed of a thin plate material, said projection projecting in a radial direction with respect to said motor axis and being bent so as to extend in a direction along said motor axis and toward said head carriage;
   said disk drive unit having a fixing means for fixing said main part of the motor in said unit; and
   said main part of the motor being rotationally controllable by means of a jig that is engaged with said engagement part, and being fixed by said fixing means after the position of the main part of the motor is rotationally controlled on the motor axis.

2. The stepping motor as claimed in claim 1, wherein said engagement part is formed integrally with said leaf.

3. The stepping motor as claimed in claim 2, wherein said leaf comprises a pressure tongue that presses said motor axis.

4. The stepping motor as claimed in claim 3, wherein said stationary part of the main part of the motor further comprises a seat plate which covers said leaf.

5. The stepping motor as claimed in claim 4, wherein said seat plate includes a depression having a depth so as to provide a specified separation away from said leaf along the extension of said motor axis.

6. The stepping motor as claimed in claim 1, wherein said leaf further comprises a pressure tongue that presses said motor axis, when installation in a disk drive unit is complete, by an elastic force toward a lead screw, and said stationary part further comprises a seat plate having a depression that covers said leaf and has a depth so as to provide a specified separation away from said leaf along the extension of said motor, and said engagement part comprises one or more projections that are formed integrally with said seat plate.

7. The stepping motor as claimed in claim 1, wherein said engagement part is provided on a circumference of the body of said main part of the motor.

8. The stepping motor as claimed in claim 7, wherein said engagement part comprises one or more projections formed integrally with the body of said main part of the motor.

9. A disk drive unit comprising:
   a chassis;
   a head carriage guided and moved on guiding means fixed onto said chassis;
   a stepping motor comprising a main part of the motor comprising a motor axis on which is formed a lead screw for driving said head carriage, a rotor for rotating said motor axis, and a stationary part of the motor, said stationary part including a stator, a body of the motor and a leaf that presses an end of said motor axis at said body of the motor, when installation in said disk drive unit is complete, by an elastic force directed along said motor axis, and an engagement part provided on said stationary part of said main part of the motor, said engagement part comprising one or more projections of a thin plate material, said projection projecting in a radial direction of said motor axis and being are bent so as to extend in a direction along said motor axis and toward said head carriage; and
   a fixing means for fixing said main part of the motor to said chassis;
   said main part of the motor being rotationally controllable by means of a jig which is engaged with said engagement part, and being fixed by said fixing means after a position of the main part of the motor is rotationally controlled on the motor axis.

10. The disk drive unit as claimed in claim 9, wherein said engagement part is formed integrally with said leaf.

11. The disk drive unit as claimed in claim 10, wherein said leaf of said stepping motor comprises a pressure tongue that presses said motor axis.

12. The disk drive unit as claimed in claim 11, wherein said stationary part of the main part of the stepping motor further comprises a seat plate which covers said leaf.

13. The disk drive unit as claimed in claim 12, wherein said seat plate includes a depression having a depth so as to provide a specified separation away from said leaf along the extension of said motor axis.

14. The disk drive unit as claimed in claim 9, wherein said leaf further comprises a pressure tongue that presses said motor axis, when installation in said disk drive unit is complete, by an elastic force toward a lead screw, and said stationary part further comprises a seat plate having a depression that covers said leaf and has a depth so as to provide a specified separation away from said leaf along the extension of said motor axis, and said engagement part comprises one or more projections that are formed integrally with said seat plate.

15. The disk drive unit as claimed in claim 9, wherein said engagement part is provided on a circumference of the body of said main part of the motor.

16. The disk drive unit as claimed in claim 15, wherein said engagement part of said stepping motor comprises one or more projections that are formed integrally with the body of said main part of the motor.

17. The disk drive unit as claimed in claim 9, wherein the lead screw of said stepping motor extends in the direction of movement of said head carriage, and
   an overall length of said unit along the direction that a disk is inserted, is determined by a size of a diameter of the disk, a maximum movement of said head carriage, and a length between a mounting plane of said stationary part of the stepping motor and an opposite end of the motor along an axial direction of the motor axis.

* * * * *